(12) United States Patent
Kim et al.

(10) Patent No.: US 12,603,767 B2
(45) Date of Patent: Apr. 14, 2026

(54) SYSTEM AND METHOD FOR OPERATING OBJECT

(71) Applicants: Hyundai Motor Company, Seoul (KR); Kia Corporation, Seoul (KR)

(72) Inventors: Dae Hyun Kim, Seoul (KR); Ig Yeong Jeong, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 232 days.

(21) Appl. No.: 18/387,704

(22) Filed: Nov. 7, 2023

(65) Prior Publication Data

US 2024/0313957 A1 Sep. 19, 2024

(30) Foreign Application Priority Data

Mar. 15, 2023 (KR) ........................ 10-2023-0033703

(51) Int. Cl.
| | |
|---|---|
| *H04L 9/08* | (2006.01) |
| *H04L 9/30* | (2006.01) |
| *H04L 9/32* | (2006.01) |

(52) U.S. Cl.
CPC .............. *H04L 9/0861* (2013.01); *H04L 9/30* (2013.01); *H04L 9/3263* (2013.01)

(58) Field of Classification Search
CPC ........ H04L 9/0861; H04L 9/30; H04L 9/3263
See application file for complete search history.

(56) References Cited

U.S. PATENT DOCUMENTS

| | | | | |
|---|---|---|---|---|
| 9,256,852 | B1 * | 2/2016 | Myllymaki | ............. B60P 3/007 |
| 10,915,891 | B1 * | 2/2021 | Winklevoss | ........... G06Q 20/36 |
| 10,985,925 | B1 * | 4/2021 | Jackson | ................ H04L 9/3268 |
| 12,087,440 | B1 * | 9/2024 | Rathi | ...................... G16H 40/67 |
| 2008/0027865 | A1 * | 1/2008 | Usui | ...................... H04L 9/3263 |
| | | | | 705/50 |
| 2015/0248640 | A1 * | 9/2015 | Srinivasan | ........... G05D 1/0676 |
| | | | | 705/338 |
| 2016/0277923 | A1 * | 9/2016 | Steffey | .................. H04W 12/04 |
| 2018/0246513 | A1 * | 8/2018 | Cronin | .................... G07F 9/001 |
| 2019/0035044 | A1 * | 1/2019 | Ferguson | ............. G05D 1/0212 |
| 2019/0227551 | A1 * | 7/2019 | Igata | ...................... G06Q 20/20 |
| 2020/0238951 | A1 * | 7/2020 | Nakajima | ............... B60R 25/01 |

(Continued)

FOREIGN PATENT DOCUMENTS

| | | | | | |
|---|---|---|---|---|---|
| CN | 110225050 B | * | 5/2022 | ............. | H04L 67/02 |

*Primary Examiner* — Darshan I Dhruv
(74) *Attorney, Agent, or Firm* — Fox Rothschild LLP

(57) ABSTRACT

A system for an object includes at least one autonomous driving platform configured to autonomously drive along an autonomous driving path, at least one object configured to be loaded at an upper portion of the at least one autonomous driving platform, unloaded from the upper portion of the at least one autonomous driving platform, and the at least one object having a corresponding product, and a server to transmit encrypted information to a selected object selected. The selected object is selected from the at least one object to provide a corresponding product to be sold to a user, based on information on purchase of a product in a specific area, and create a certificate to authenticate the selected object. The autonomous driving platform receives a connection request from the selected object and the server transmits an authentication request to the selected object.

18 Claims, 15 Drawing Sheets

(56) References Cited

U.S. PATENT DOCUMENTS

| 2021/0132625 A1* | 5/2021 | Gillett ................. G05D 1/0088 |
| 2021/0152545 A1* | 5/2021 | Park ..................... H04L 9/3268 |
| 2021/0273788 A1* | 9/2021 | Hegai ....................... H04L 9/14 |
| 2022/0141004 A1* | 5/2022 | Murray ................ H04L 9/0861 |
| | | 713/171 |
| 2022/0159461 A1* | 5/2022 | Maass .................. H04L 9/0894 |
| 2023/0092235 A1* | 3/2023 | Skaaksrud .............. G05D 1/65 |
| | | 701/23 |
| 2023/0422327 A1* | 12/2023 | Kobayashi ......... H04L 63/0823 |

* cited by examiner

110

| COMMUNICATION DEVICE 111 | ⟷ | PROCESSOR 113 | ⟷ | STORAGE 112 |

130

SYSTEM AND METHOD FOR OPERATING OBJECT

CROSS-REFERENCE TO RELATED APPLICATION

This application claims under 35 U.S.C. § 119(a) the benefit of and priority to Korean Patent Application No. 10-2023-0033703, filed in the Korean Intellectual Property Office on Mar. 15, 2023, the entire contents of which are incorporated herein by reference.

BACKGROUND

1. Technical Field

The present disclosure relates to a system and a method for operating an object.

2. Background

Recently, an unmanned store has been formed and a Robomart has been developed to deliver a product to a user. The Robomart, which is a mobile unmanned supermarket, may be realized through an autonomous vehicle which delivers a product to a user position, when the user orders products such as groceries. In addition, various devices are required to be integrated into an autonomous vehicle depending on the type of product to keep the product desired by the user safe and fresh and to deliver the product to a user position, and the required devices may be varied depending on products desired by the user. For example, an autonomous vehicle may require a shelf for displaying processed food to deliver a processed product. In addition, the autonomous vehicle may require a refrigerating device to deliver foods difficult to store without refrigeration.

Accordingly, when manufacturing the autonomous vehicle, the autonomous vehicle has to be manufactured in various forms depending on product types desired by the user, which increases the manufacturing costs of the Robomart.

SUMMARY

The present disclosure has been made to solve the above-mentioned problems occurring in the prior art while advantages achieved by the prior art are maintained intact.

An aspect of the present disclosure provides a system and a method for operating an object, capable of selecting an object, which is to provide a product desired by a user, and an autonomous driving platform, which is to move the object to the destination, based on local information, and joining the object to the autonomous driving platform such that the joining structure autonomously drives.

Another aspect of the present disclosure provides a system and a method for operating an object, capable of encrypting, in a server, main information including a product desired by a user, information on a desired amount, and information on a movement path, of transmitting the encrypted main information to the object, and allowing the object to identifying the main information by performing decryption using a public key received in the server, such that the main information transmitted and received between the server and the object is not easily open to the outside.

Another aspect of the present disclosure provides a system and a method for operating an object, enabling an autonomous driving platform to have a reliability for an object, as the object requests a server to create a certificate, and is authenticated using the certificate received from the server, when the autonomous driving platform receives a connection request from the object and transmits an authentication request to the object.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for an object, may include at least one autonomous driving platform configured to autonomously drive along an autonomous driving path, at least one object configured to be: loaded at an upper portion of the at least one autonomous driving platform, and unloaded from the upper portion of the at least one autonomous driving platform, and the at least one object having a corresponding product, and a server configured to transmit encrypted information to a selected object, wherein the selected object is selected from the at least one object to provide a corresponding product to be sold to a user, based on information on purchase of a product, and create a certificate to authenticate the selected object, when the autonomous driving platform receiving a connection request from the object transmits an authentication request to the object.

According to an embodiment, the server may create a server private key and a server public key, and transmit the server public key to the selected object and the autonomous driving platform.

According to an embodiment, the server may encrypt information corresponding to a specific area, wherein the information corresponding to the specific area includes the information on the purchase of the product in the specific area, an autonomous driving path to the specific area, and information on a map including the specific area, wherein the server encrypts the information corresponding to the specific area by using the server private key and transmit an encrypted result to the selected object.

According to an embodiment, the selected object may decrypt the encrypted information using the server public key, and generate an autonomous driving path to the specific area.

According to an embodiment, the selected object may request the server to create the certificate in response to receiving the authentication request from the autonomous driving platform.

According to an embodiment, the server may create an object private key and an object public key in response to receiving a request to create the certificate from the selected object, and transmit a signature to the selected object, the signature being encrypted using the server private key and the certificate including the object public key to the object.

According to an embodiment, the selected object may store the object private key, and transmit the encrypted signature and the certificate including the object public key to the autonomous driving platform.

According to an embodiment, the autonomous driving platform may store the object public key and verify the certificate by encrypting the encrypted signature by using the server public key.

According to an embodiment, the autonomous driving platform may authenticate the selected object through a challenge and response authentication, after the certificate is completely verified.

According to an embodiment, the autonomous driving platform may create a random message, when the certificate is completely verified, and transmit the random message to the object.

According to an embodiment, the autonomous driving platform may encrypt the random message using the object private key, and transmit an encrypted random message to the autonomous driving platform.

According to an embodiment, the autonomous driving platform may decrypt the encrypted random message using the object private key, compare a decrypted random message with the random message, and determine the selected object as being verified, when the decrypted random message is matched with the random message as a comparison result.

According to an embodiment, the autonomous driving platform may admit connection with the selected object after the selected object is authenticated.

According to an embodiment, the server may request a distribution center to load a product allocated to the selected object onto the object after the selected object is connected to the autonomous driving platform.

According to an embodiment, the selected object may create a movement path after the product is loaded onto the selected object, and transmit the movement path to the autonomous driving platform.

According to another aspect of the present disclosure, method for operating an object, may include transmitting encrypted information to a selected object selected, wherein the object is selected from among at least one object, in which the at least one object is loaded at an upper portion of an autonomous driving platform configured to autonomously drive, and unloaded from the upper portion of the autonomous driving platform, and wherein the selected object further comprises and has a product, providing the product to be sold to a user, based on information for purchase of the product, and creating, by a server, a certificate to authenticate the selected object, after the autonomous driving platform receives a connection request from the selected object and transmits an authentication request to the object.

According to an embodiment, the method may further include creating, by the server, a server private key and a server public key, and transmitting the server public key to the selected object and the autonomous driving platform.

According to an embodiment, the method may further include encrypting, by the server, information corresponding to a specific area, wherein the information corresponding to the specific area includes the information on the purchase of the product in a specific area, an autonomous driving path to the specific area, and information on a map including the specific area, wherein the server encrypts the information corresponding to the specific area by using the server private key, and transmitting an encrypted result to the selected object.

According to an embodiment, the method may further include decrypting, by the selected object, the encrypted information corresponding to the specific area using the server public key, and generating an autonomous driving path to the specific area.

According to an embodiment, the method may further include creating, by the server, an object private key and an object public key, after receiving a request to create the certificate from the selected object, to transmit a signature encrypted using the server private key and the certificate including the object public key to the selected object, and receiving, by the autonomous driving platform, the object public key from the selected object, storing the object public key, and verifying the certificate by encrypting the encrypted signature by using the server public key.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
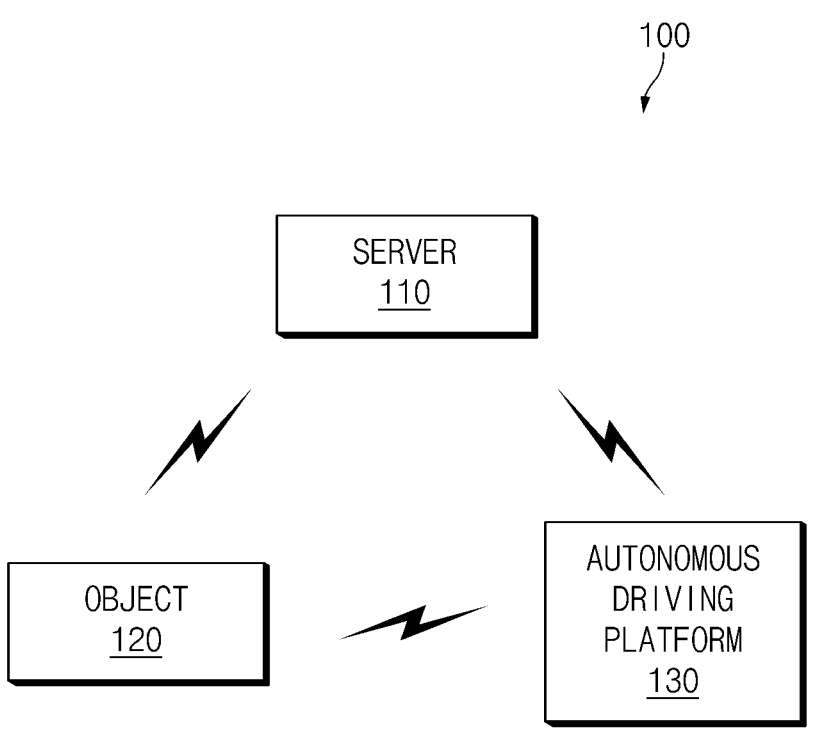
FIG. 1 is a view illustrating the configuration of a system for operating an object, according to an embodiment of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, a detailed description of well-known features or functions will be ruled out in order not to unnecessarily obscure the gist of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

In describing the components of the embodiment according to the present disclosure, terms such as first, second, "A", "B", "(a)", "(b)", and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating the configuration of a system for operating an object, according to an embodiment of the present disclosure.

As illustrated in FIG. 1, a system 100 for operating the object may include a server 110, an object 120, and an autonomous driving platform 130.

The server 110 may include a server to transmit encrypted information to an object, when selecting an object, which provides a product to be sold to a user, of at least one object, based on information on the purchase of the product, and to authenticate the object, when the autonomous driving platform receiving a connection request from the object transmits an authentication request to the object.

The object 120 may be connected to the autonomous driving platform 130 to transmit or receive information. For example, the object 120 may be loaded at an upper portion the autonomous driving platform 120, and unloaded from the upper portion of the autonomous driving platform 130. The object 120 may include an autonomous mart having the form loaded onto the upper portion of the autonomous driving platform 130, and may include a specific space having the form of an unmanned store to load products for sale to the user. According to an embodiment, the object 120 may include at least one object depending on the types of products to be provided to the user. For example, the object 120 may be stored in a large-scale warehouse (logistics storage). The object 120 may include an object having processed food (processed food autonomous mart), an object having drinks (drink autonomous mart), an object having fresh food (fresh food autonomous mart), an object having frozen food (frozen food autonomous mart), and an object having coffee (coffee autonomous mart).

The autonomous driving platform 130 may include mobility to autonomously drive. For example, the autonomous driving platform may include an autonomous vehicle including an autonomous driving truck, or an autonomous driving bus. According to an embodiment, the autonomous driving platform 130 may include a mobility that moves by two or more wheels, and may be implemented in a form in which the object 120 may be loaded onto the upper portion thereof. At least one autonomous driving platform 130 may be present depending on a battery capacity, movable speed, weight, or driving performance, and may be stored in a large-scale warehouse (logistics storage). The place for storing the autonomous driving platform 130 may be a place the same as or different from the place for storing the object 120.

Figure 2:
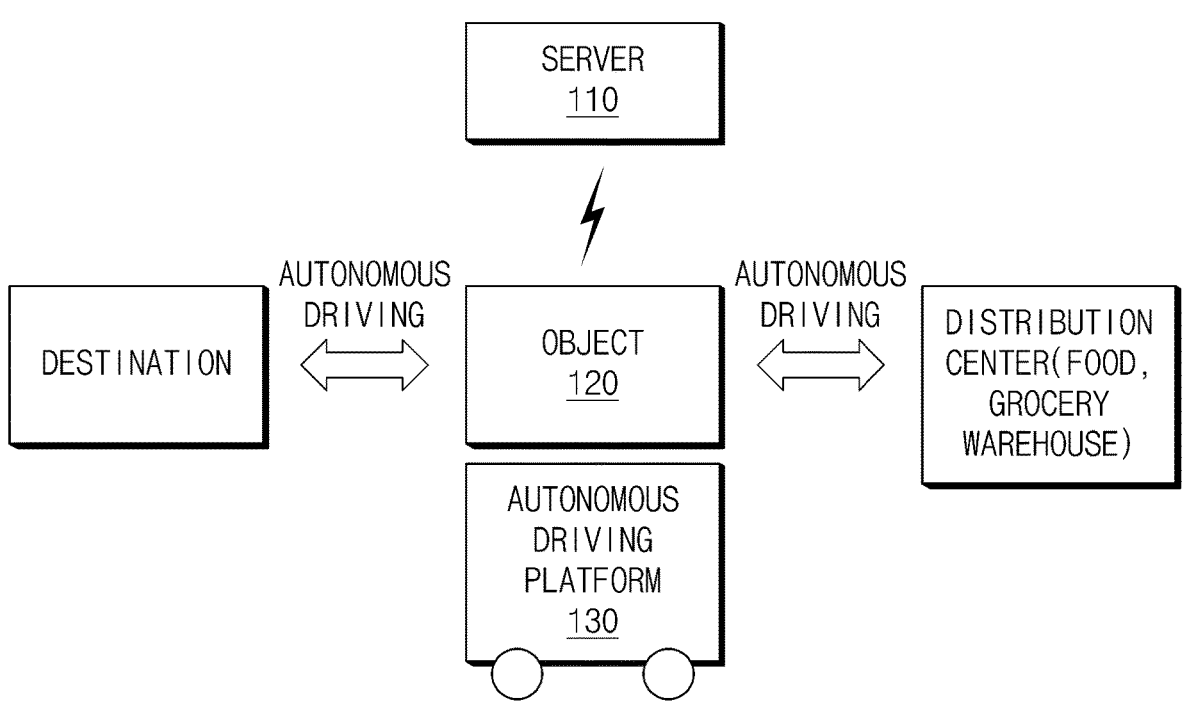
FIG. 2 is a view schematically illustrating the operation of a system for operating an object, according to an embodiment of the present disclosure.

FIG. 2 is a view illustrating the configuration of a system for operating an object, according to an embodiment of the present disclosure.

As illustrated in FIG. 2, the server 110 may make wireless communication with the object 120 and the autonomous driving platform 130. When the autonomous driving platform 130 is joined to the object 120, the autonomous driving platform 130 may self-drive to a distribution center to load a product on the object 120, and may self-drive to a destination to provide the product to the user.

Figure 3:
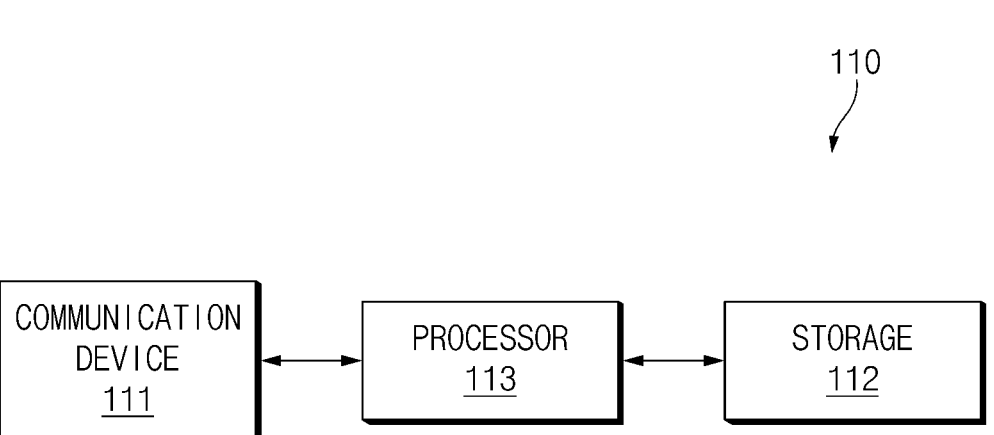
FIG. 3 is a view illustrating the configuration of a server, according to an embodiment of the present disclosure.

FIG. 3 is a view illustrating the configuration of a server, according to an embodiment of the present disclosure.

As illustrated in FIG. 3, the server 110 may include a communication device 111, a storage 112, and a processor 113.

The communication device 111 may make wireless communication with the object 120 and the autonomous driving platform 130. For example, the communication device 111 may make wireless communication with the object 120 and the autonomous driving platform 130 through various wireless communication schemes including WiFi, Wibro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LET).

The storage 112 may store at least one algorithm to compute or execute various instructions for the operation of the server according to an embodiment of the present disclosure. In addition, the storage 112 may store the product purchase information, which is received from the purchase server, depending on time zones. The storage 112 may include at least one storage medium of at least one a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, or an optical disc.

The processor 113 may be implemented by various processing devices, such as a microprocessor embedded therein with a semiconductor chip to operate or execute various instructions, and may control the operation of the server according to an embodiment of the present disclosure. The processor 113 may be electrically connected to the communication device 111 or the storage 112 through a cable or various circuits to transmit an electrical signal including a control command and may transmit or receive the electrical signal including the control command through various wireless communication network, such as a control area network (CAN). The details thereof will be made with reference to FIGS. 4 to 8.

FIGS. 4 to 8 are views schematically illustrating the operation of a server, according to an embodiment of the present disclosure.

Figure 4:
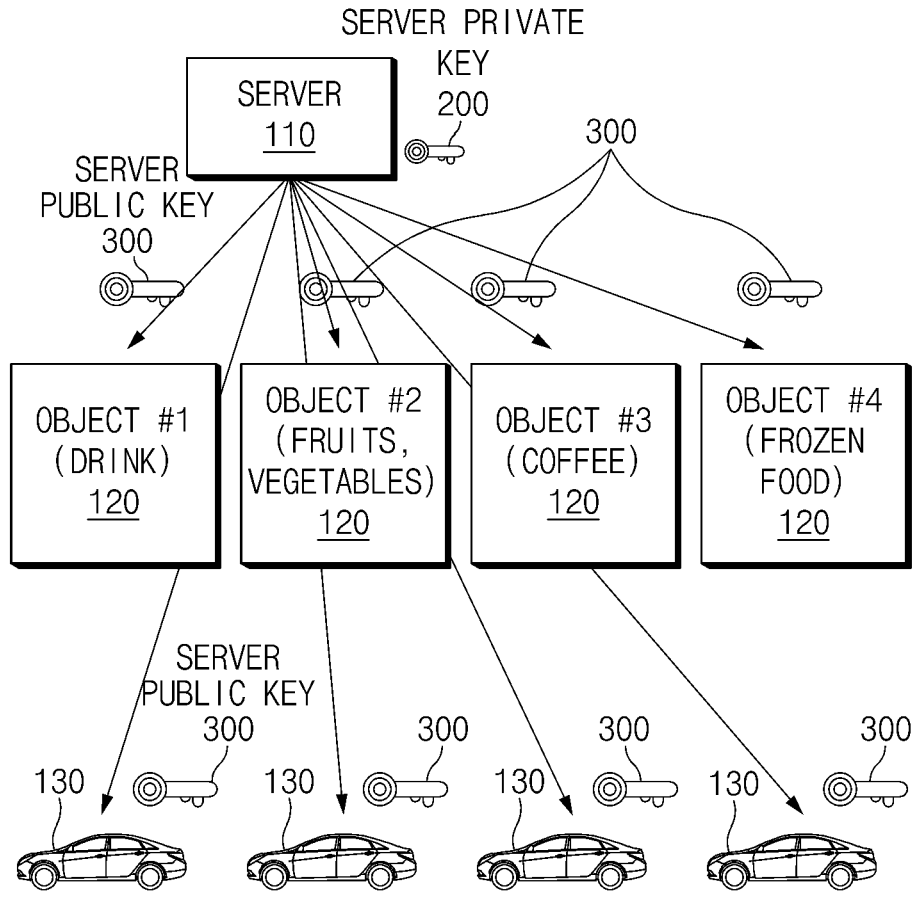
FIGS. 4 to 8 are views schematically illustrating the operation of a server, according to an embodiment of the present disclosure.

As illustrated in FIG. 4, the processor 113 may create a server private key 200 and a server public key 300. The server private key 200 may be stored in the storage 112, and the server public key 300 may be transmitted to at least one object 120 and at least one autonomous driving platform 130.

Figure 5:
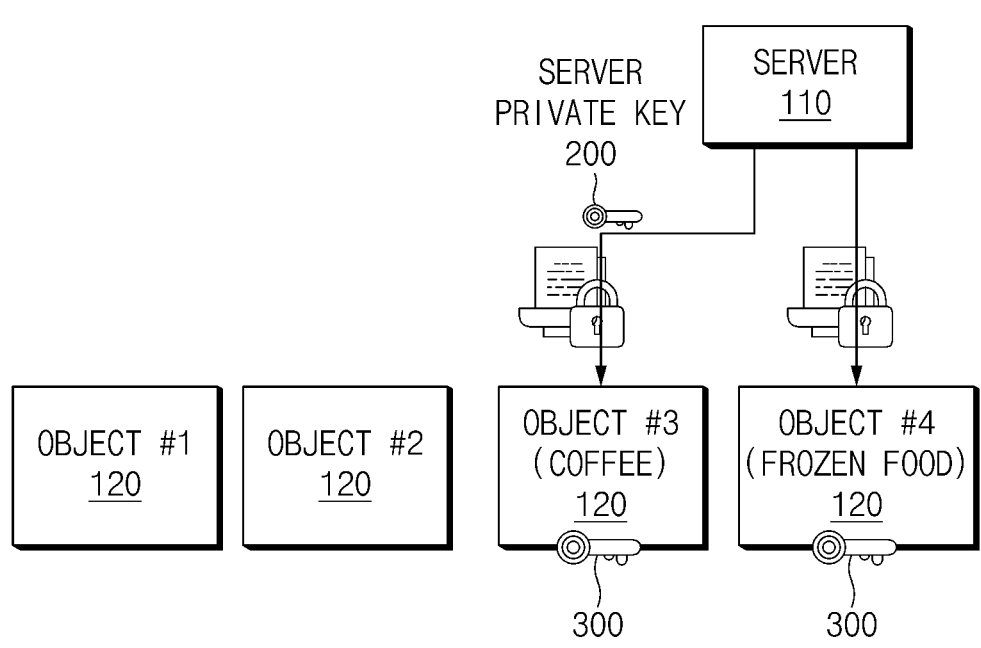

As illustrated in FIG. 5, the processor 113 may select an object (e.g., an autonomous coffee mart, or an autonomous frozen mart) for providing a product to be sold to a user, from at least one object, based on information (product purchase information) on the purchase of a product in a specific area.

The processor 113 may encrypt, using the server private key 200, information (specific area information) on a specific area, which includes product purchase information in a specific area, an autonomous driving path to the specific area, and map information including the specific area, and may transmit an encrypted result to the object 120.

The object 120 may decrypt the encrypted information using the received server public key 300, and may generate a movement path (autonomous driving path) such that the maximum sales are achieved for each time slot.

Figure 6:
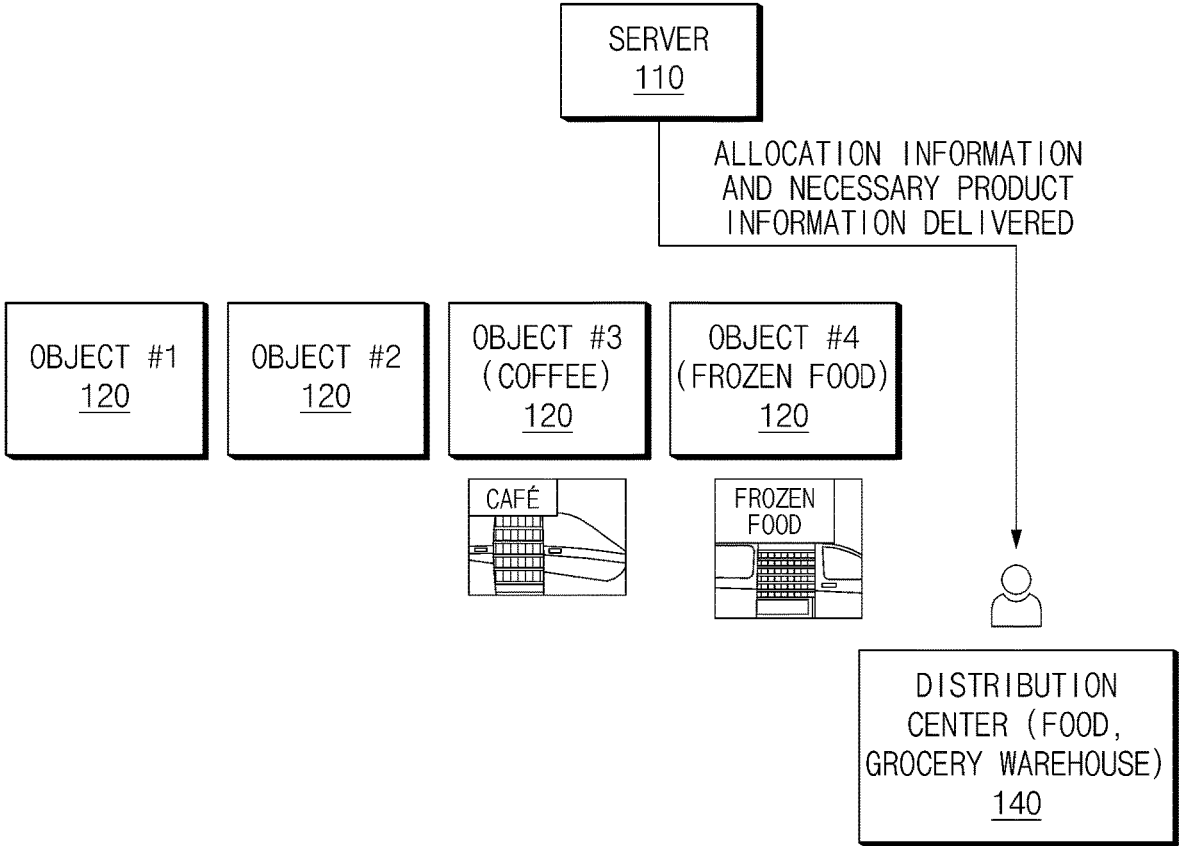

As illustrated in FIG. 6, the processor 113 may transmit the specific area information, which is transmitted to the object 120, and necessary product information to a distribution center 140, such that a distribution center manager prepares for a necessary product, based on the information received to the distribution center 140.

Figure 7:
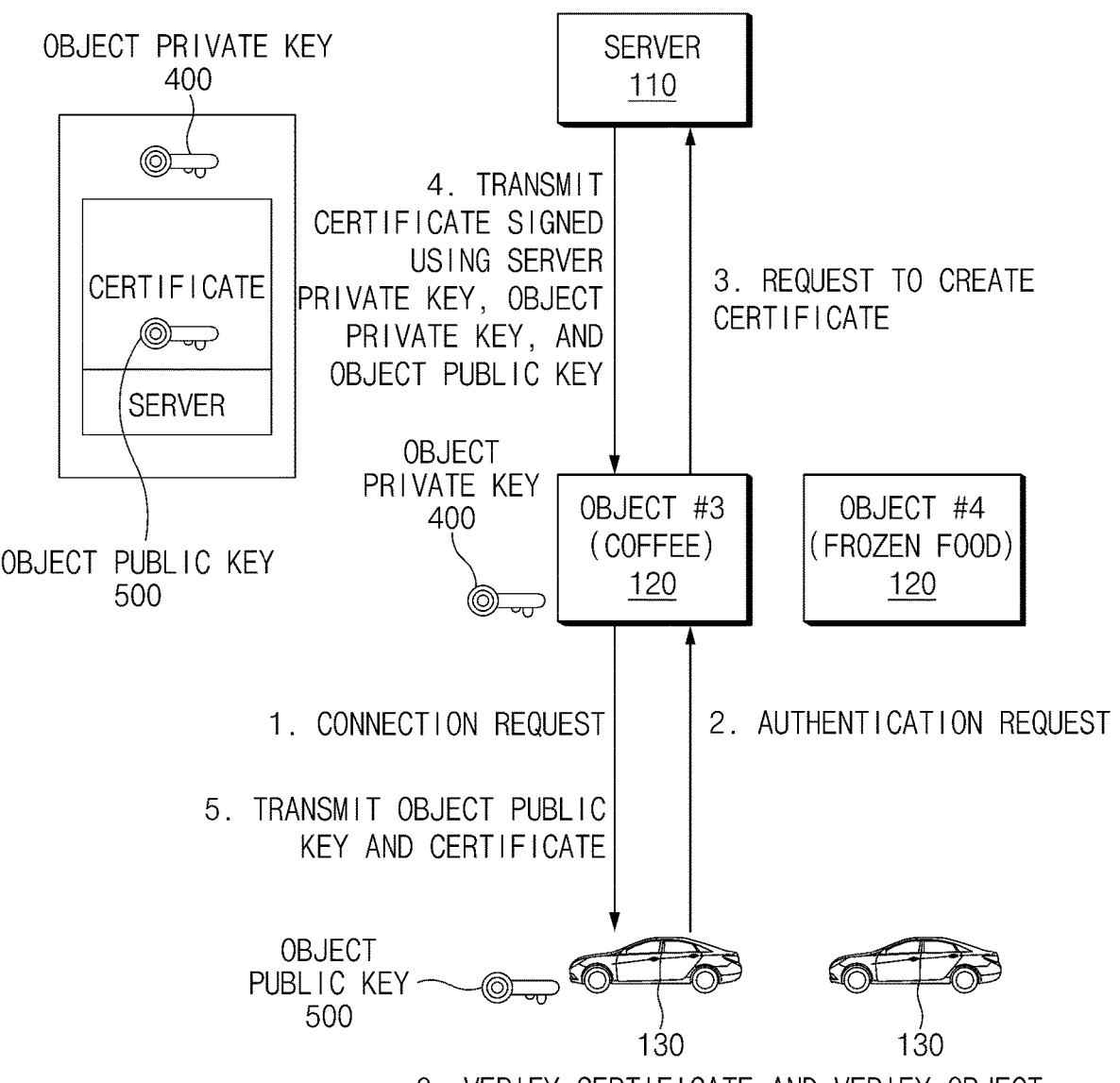

As illustrated in FIG. 7, the processor 113 may authenticate the object 120, when the autonomous driving platform 130 having a connection request received from the object 120 transmits an authentication request to the object 120.

According to an embodiment, the object 120 (coffee autonomous mart) may request the server 110 to create a certificate, when receiving the authentication request from the autonomous driving platform 130.

The processor 113 may create the certificate, an object private key 400 and an object public key 500 for authenticating the object, when receiving the request for the certificate from the object 120.

Alternatively, the processor 113 may create a digest indicating a hash value in a Hash algorithm for converting a specific data block of the certificate to have a fixed length. In addition, the processor 113 may create an electronic signature by encrypting the digest using the server private key 200.

The processor 113 may transmit, to the object 120, a signature encrypted using the server private key, a certificate included in the object public key 500, and the object private key 400 through a transport layer security (TLS) protocol. In addition, the object 120 may store the object private key 400, may transmit the object public key 500, the electronic signature, and the certificate to the autonomous driving platform 130. The autonomous driving platform 130 may verify the certificate using the server public key 300 and the object public key 500, and may authenticate the object 120. The autonomous driving platform 130 may admit the connection with the object 120, when the object 120 is authenticated.

Although not illustrated in FIG. 7, the processor 113 may authenticate the object 120 (frozen food autonomous mart) in the manner described above, when the autonomous driving platform 130 having the connection request from the object 120 (frozen food autonomous mart) transmits an authentication request to the object 120.

Figure 8:
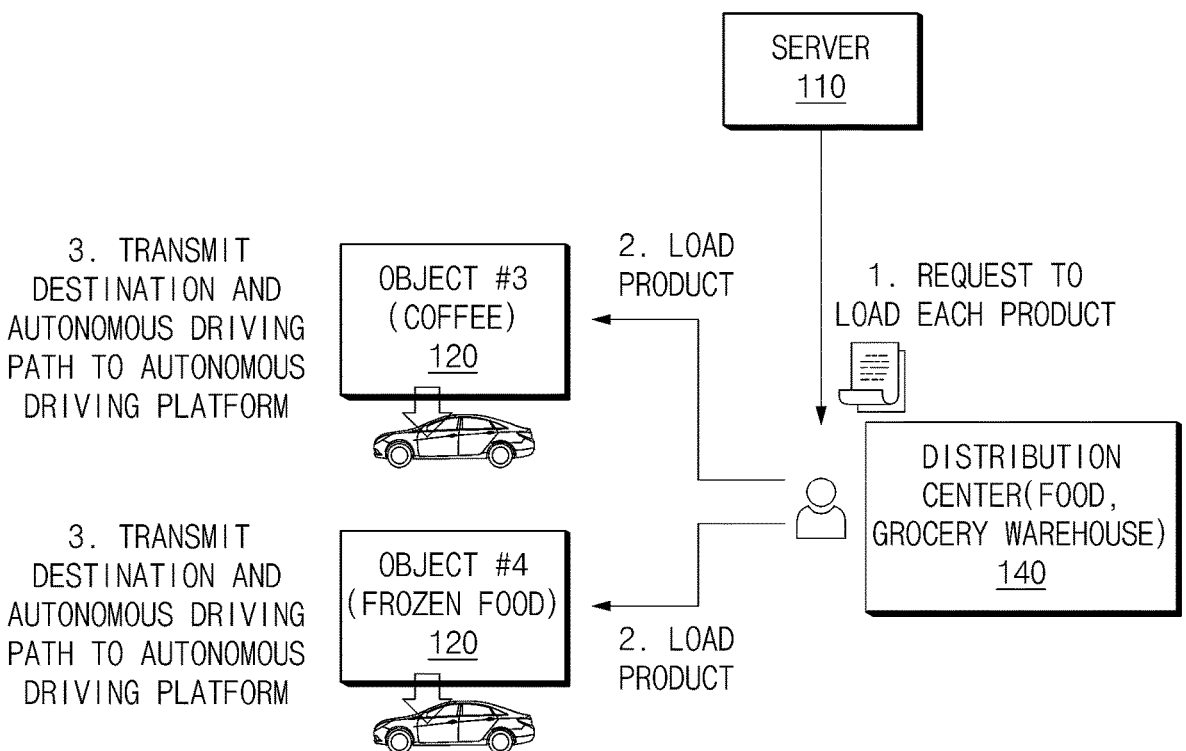

As illustrated in FIG. 8, the processor 113 may deliver a product, which is to be loaded into the object 120, to the distribution center, such that the distribution center manager loads the product, when the autonomous driving platform 130 is connected to the object 120. The object 120 may transmit a destination and an autonomous driving path to the autonomous driving platform 130, when the product is loaded.

Figure 9:
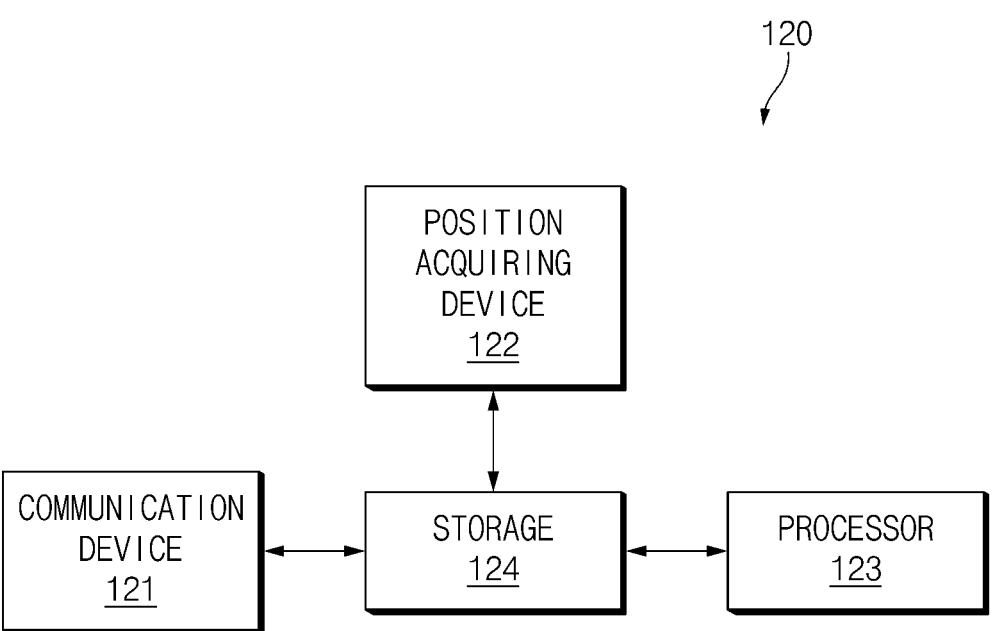
FIG. 9 is a view illustrating the configuration of an object, according to an embodiment of the present disclosure.

FIG. 9 is a view illustrating the configuration of an object, according to an embodiment of the present disclosure.

As illustrated in FIG. 9, the object 120 may include a communication device 121, a position acquiring device 122, a storage 123, and a processor 124. Although not illustrated, the object 120 may have the form easily loaded onto the upper portion of the autonomous driving platform 130, easily storing a product, and easily providing the product to the user. Accordingly, the object 120 may include at least one receiving structure, and a door to be open.

The communication device 121 may make wireless communication with the server 110 and the autonomous driving platform 130. For example, the communication device 121 may make wireless communication with the server 110 and the autonomous driving platform 130 through various wireless communication schemes including WiFi, Wibro, Global System f Mobile Communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LET). In addition, the communication device 121 may make wireless communication with the terminal (a mobile phone, tablet PC, a laptop computer, or a vehicle terminal) of a user, and transmit inventory information of the product and information on the position of the object 120 to the terminal of the user.

The position acquiring device 122 may include a global positioning system (GPS) receiver to acquire information on the position of the object, map the position of the object to map data, which is previously stored, and may provide a path from a present position to a destination which is received from the server 110.

The storage 123 may store at least one algorithm to compute or execute various instructions for the operation of the object according to an embodiment of the present disclosure. The storage 123 may include at least one storage medium of at least one a flash memory, a hard disc, a memory card, a Read Only Memory (ROM), a Random Access Memory (RAM), an Electrically Erasable and Programmable ROM (EEPROM), a Programmable ROM (PROM), a magnetic memory, a magnetic disc, or an optical disc.

The processor 124 may be implemented by various processing devices, such as a microprocessor embedded therein with a semiconductor chip to operate or execute various instructions, and may control the operation of the object according to an embodiment of the present disclosure. The processor 124 may be electrically connected to the communication device 121, the position acquiring device 122, or the storage 123 through a cable or various circuits to transmit an electrical signal including a control command and may transmit or receive the electrical signal including the control command through various wireless communication networks, such as a control area network (CAN).

When receiving the server public key 300 from the server 110, the processor 113 may store the server public key 300 into the storage 123.

The processor 124 may decrypt information on encrypted specific area information by using the server public key 300, when receiving the information on the encrypted specific area information, and may generate a movement path (autonomous driving path) for achieving the optimal sales for each time slot, based on the decrypted specific area information.

The processor 124 may request the server 110 to create the certificate (see FIG. 7), when receiving the authentication request from the autonomous driving platform 130 by transmitting a connection request to the autonomous driving platform 130.

The processor 124 may receive the electronic signature, the certificate including the object public key 500, and the object private key 400 from the server 110, may store the object private key 400 in the storage 123, and may transmit the electronic signature, the certificate, and the object public key 500 to the autonomous driving platform 130.

The processor 124 may transmit an authentication request for the object to the autonomous driving platform 130, after transmitting the certificate to the autonomous driving platform 130, and may receive a random message for authenticating the object 120 from the autonomous driving platform 130.

The processor 124 may encrypt the random message received using the object private key 400, and may transmit the encrypted random message to the autonomous driving platform 130.

The processor 124 may receive a message (authentication completion message) for indicating authentication completed, when the authentication for the object 120 is completed by the autonomous driving platform 130.

The processor 124 may transmit the destination and the autonomous driving path to the autonomous driving platform 130, when authenticated by the autonomous driving platform 130 and connected to the autonomous driving platform 130.

Figure 10:
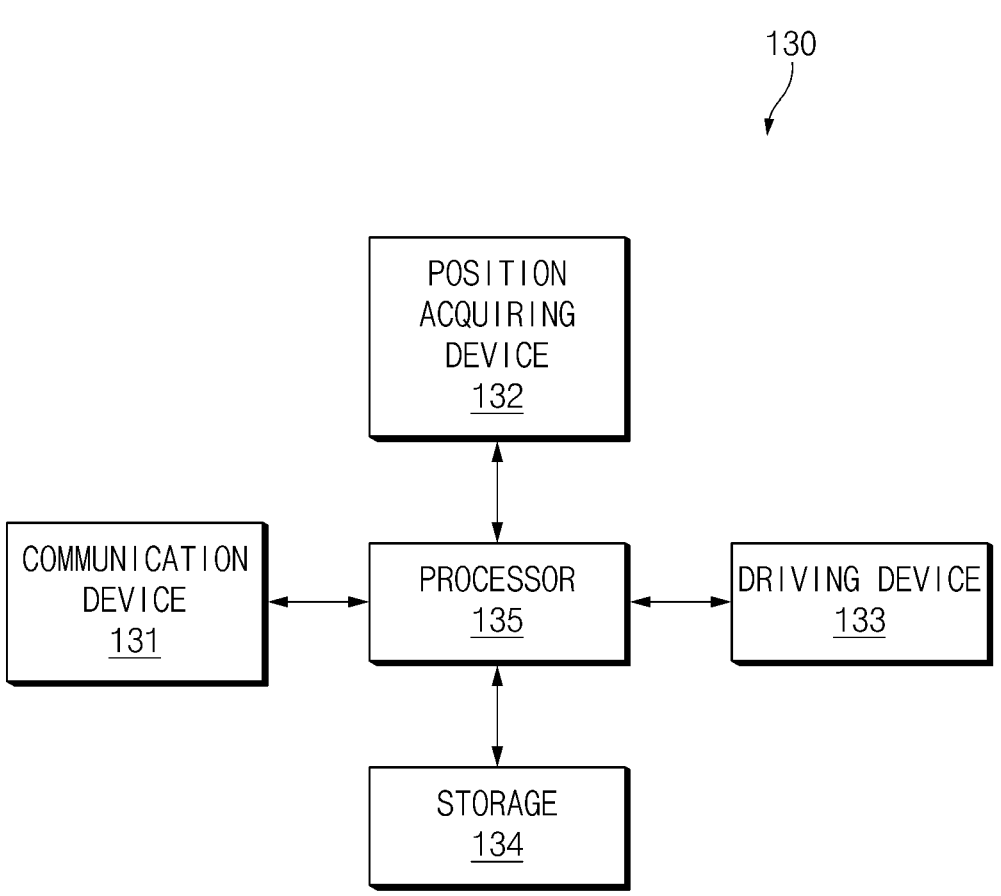
FIG. 10 is a view illustrating the configuration of an autonomous driving platform, according to an embodiment of the present disclosure.

FIG. 10 is a view illustrating the configuration of an autonomous driving platform, according to an embodiment of the present disclosure.

As illustrated in FIG. 10, the autonomous driving platform 130 may include a communication device 131, a position acquiring device 132, a driving device 133, a storage 134, and a processor 135.

The communication device 131 may make wireless communication with the server 110 and the object 120. For example, the communication device 131 may make wireless communication with the server 110 and the object 120 through various wireless communication schemes including WiFi, Wibro, Global System for Mobile Communication (GSM), Code Division Multiple Access (CDMA), Wideband Code Division Multiple Access (WCDMA), Universal Mobile Telecommunication System (UMTS), Time Division Multiple Access (TDMA), Long Term Evolution (LET).

The position acquiring device 132 may include a global positioning system (GPS) receiver to acquire information on the position of the object, map-match the position of the object to map data, which is previously stored, and may provide a path from a present position to the destination which is received from the server 110.

The driving device 133 may control the movement of the autonomous driving platform, based on the command of the processor 135, which corresponds to the moving command received from the object 120. For example, the driving device 133 may include a motor driver, a steering driver, a brake driver, a lamp driver, or a suspension driver.

The storage 134 may store at least one algorithm to compute or execute various instructions for the operation of the autonomous driving platform according to an embodiment of the present disclosure. The storage 134 may include at least one storage medium of at least one a flash memory, a hard disc, a memory card, a Read Only Memory (ROM), a Random Access Memory (RAM), an Electrically Erasable and Programmable ROM (EEPROM), a Programmable ROM(PROM), a magnetic memory, a magnetic disc, or an optical disc.

The processor 135 may be implemented by various processing devices, such as a microprocessor embedded therein with a semiconductor chip to operate or execute various instructions, and may control the operation of the autonomous driving platform according to an embodiment of the present disclosure. The processor 135 may be electrically connected to the communication device 131, the position acquiring device 132, the driving device 133, or the storage 134 through a cable or various circuits to transmit an electrical signal including a control command and may transmit or receive the electrical signal including the control command through various wireless communication network, such as a control area network (CAN).

The processor 135 may receive the server public key 300 from the server 110 and may store the server public key 300 in the storage 134.

The processor 135 may transmit an authentication request to the object 120, when receiving the connection request from the object 120. The processor 134 may generate a digest of a certificate indicating a hash value in a hash algorithm for converting a data block of the certificate to have a fixed length, when receiving the certificate including the object public key 500, and the electronic signature from the object 120, after transmitting the authentication request to the object 120. In addition, the processor 135 may compare the digest of the certificate with a digest which is identified as the electronic signature is encrypted using the server public key 300.

The processor 135 may determine that the certificate as being verified, when the digests are matched with each other according to the comparison result.

The processor 135 may generate the random message for authenticating the object 120, when receiving the authentication request from the object 120. The processor 135 may transmit the random message to the object 120. The processor 135 may decrypt the random message, which is encrypted, using the object public key 500, when receiving the encrypted random message from the object.

The processor 135 may compare the random message generated to authenticate the object 120 with the random message identified through decryption. When the random message generated to authenticate the object 120 is matched with the random message identified through the decryption, the processor 135 may determine the object 120 as being authenticated.

The processor 135 may transmit a comparison result message to the object 120. For example, when the two random messages are determined as being matched with each other, the processor 135 may transmit the authentication completion message.

The processor 135 may admit the connection with the object 120, when determining the object 120 as being authenticated. In addition, when receiving the autonomous driving path from the object 120, the processor 135 may control autonomous driving along the autonomous driving path. The operation according to an embodiment will be described below with reference to FIG. 11.

Figure 11:
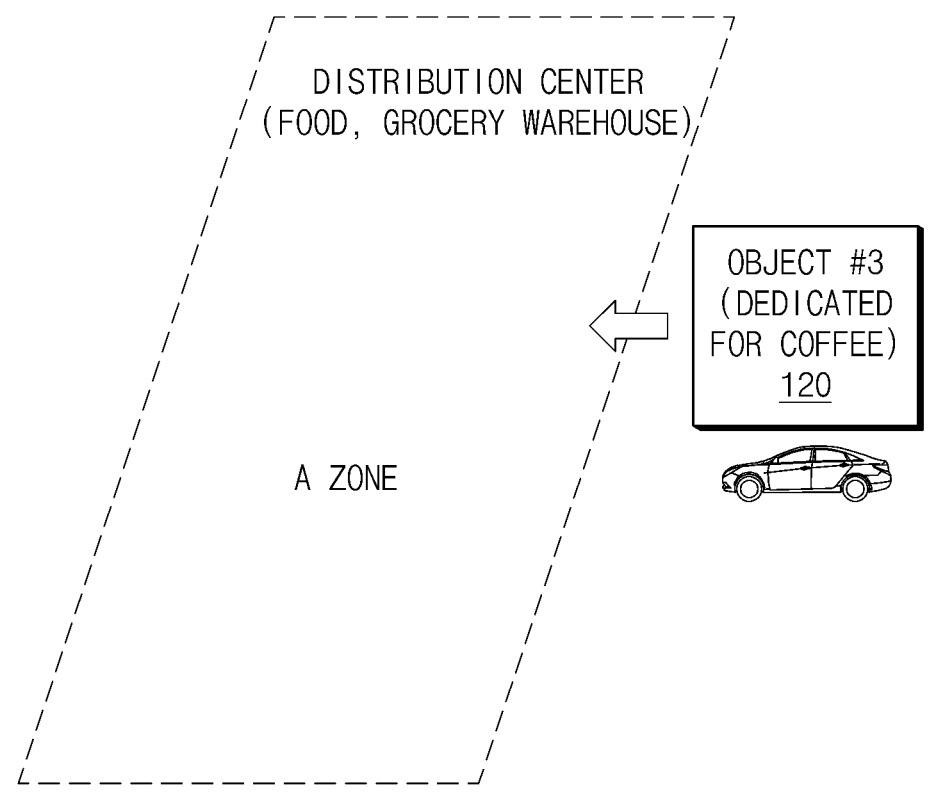
FIG. 11 is a view schematically illustrating the operation of an autonomous driving platform joined with an object and moving to the distribution center, according to an embodiment of the present disclosure.

FIG. 11 is a view schematically illustrating the operation of an autonomous driving platform joined with an object and moving to the distribution center, according to an embodiment of the present disclosure.

The processor 135 may control autonomous driving to a distribution center, when receiving, from the object 120, an autonomous driving path which is generated as the distribution center is set as a destination.

Figure 12:
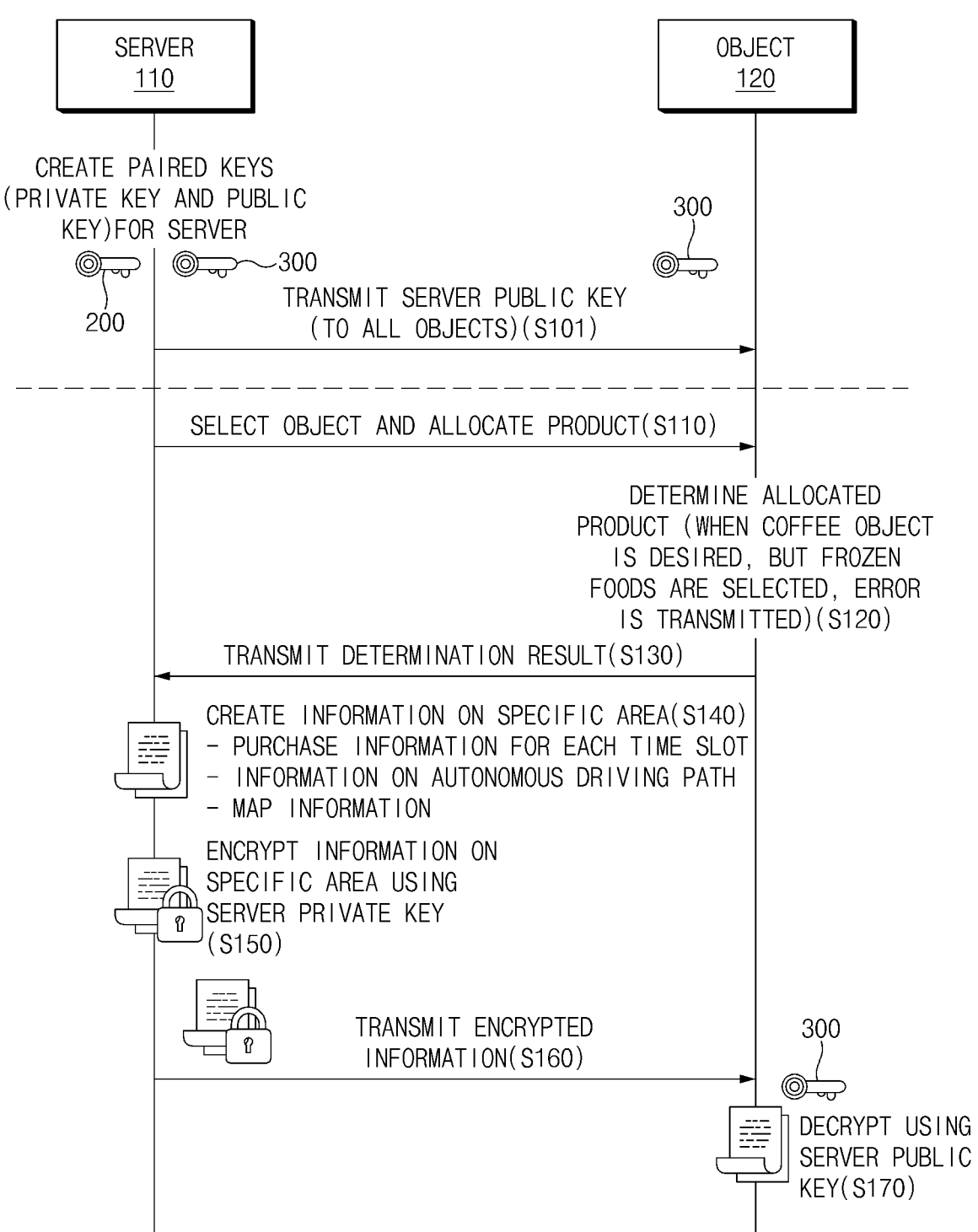
FIGS. 12 to 14 are flowcharts illustrating a method for operating an object, according to an embodiment of the present disclosure.
Figure 13:
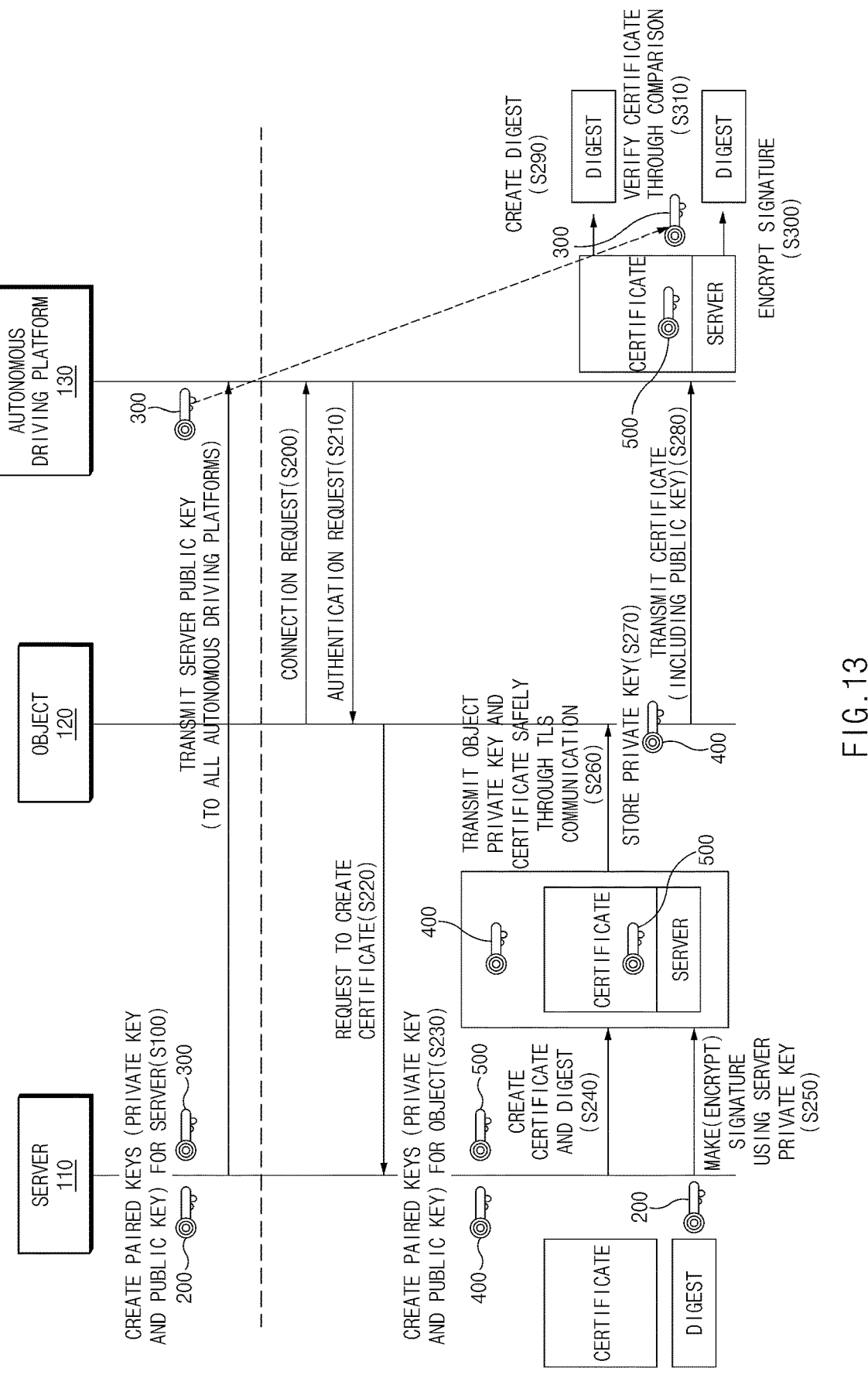
Figure 14:
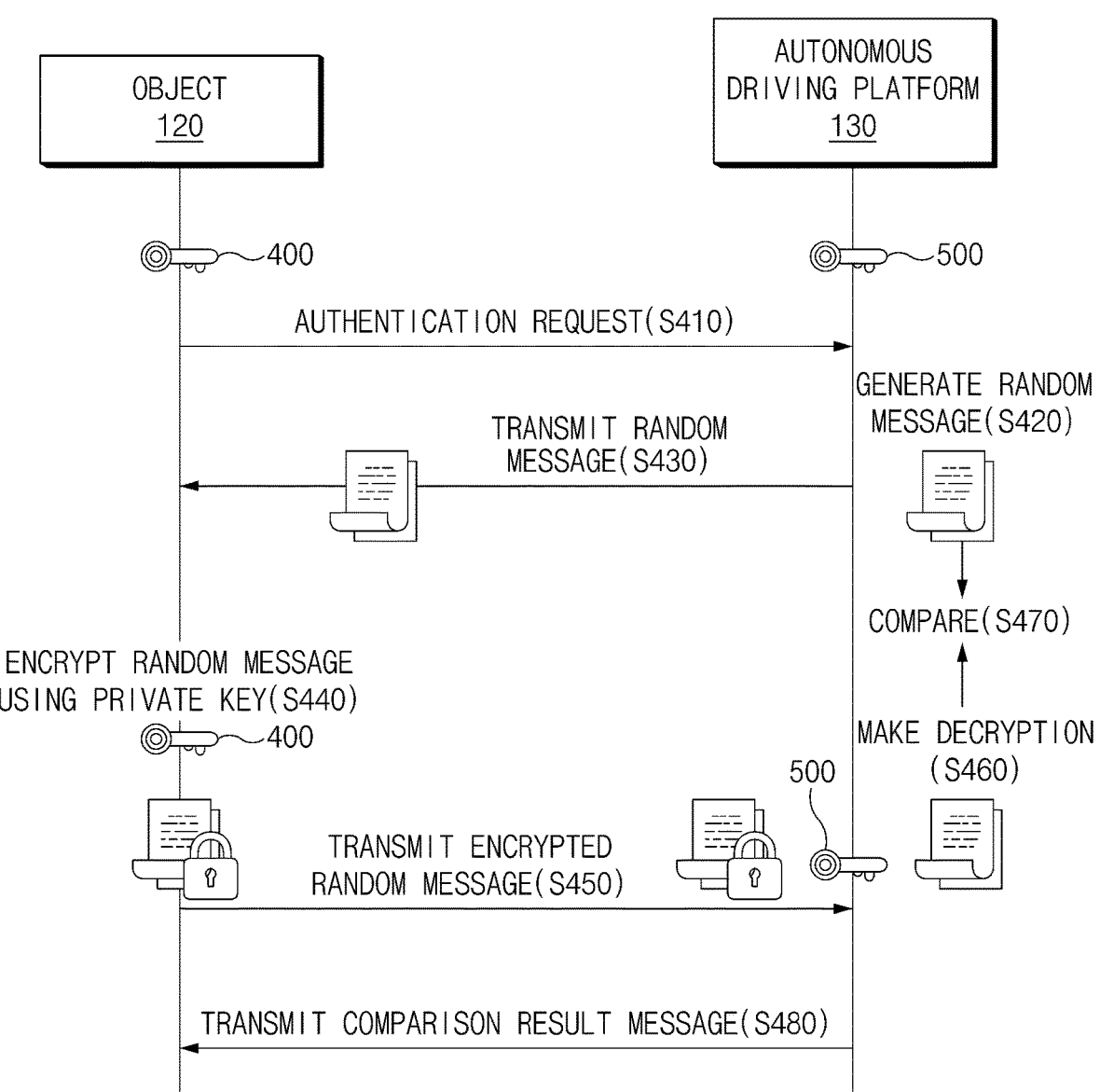

FIGS. 12 to 14 are flowcharts illustrating a method for operating an object, according to an embodiment of the present disclosure.

As illustrated in FIG. 12, the server 110 may create the server private key 200 and the server public key 300 (S100).

The server 110 may store the server private key 200 in the storage 112, and may transmit the server public key 300 to at least one object 120 (S101).

The server 110 may allocate a product, which is to be sold, to a user, based on product purchase information in a specific area, in at least one object, and may select an object (e.g., a coffee autonomous mart, a frozen food autonomous art) to provide the product (S110).

The object 120 may determine the allocated product (S120). In S120, the object 120 may determine whether the allocated product is matched with the object 120. For example, even though the object 120 is a coffee object, when a frozen food is allocated, the object 120 may determine an error as occurring.

The object 120 may transmit the determination result to the server 110 (S130).

The server 110 may generate specific area information, when the error is determined as being absent (S140). In S140, the server 110 may generate the specific area information including the information (purchase information for each time slot) on the purchase of the product, which is previously stored, and map information including a specific area.

The server 110 may encrypt the specific area information using the server private key 200 (S150).

The server 110 may transmit the encrypted specific area information to the object 120 (S160).

The object 120 may decrypt the encrypted specific area information using the server public key 300 which is previously received (S170). In S170, the object 120 may decrypt the encrypted information using the received server public key 300, and may generate a movement path (autonomous driving path) such that the maximum sales are achieved for each time slot.

Thereafter, although not illustrated in FIG. 12, the server 110 may transmit the specific area information and the necessary product information, which are transmitted to the object 120, to the distribution center 140, such that the manager of the distribution center prepares for a necessary product based on the transmitted information.

As illustrated in FIG. 13, the server 110 may generate the server private key 200 and the server public key 300 (S100).

The server 110 may store the server private key 200 in the storage 112, and may transmit the server public key 300 to at least one autonomous driving platform 130 (S102).

The object 120 may transit a connection request to the autonomous driving platform 130 (S200).

The autonomous driving platform 130 may transmit the authentication request for the object (S210).

The object 120 may request the server 110 to create a certificate (S220).

The server 110 may generate the object private key 400 and the object public key 500 for authenticating the object, when receiving the request to create the certificate, from the object 120 (S230).

The server 110 may create a certificate for authenticating the object and may create a digest indicating a hash value in a Hash algorithm for converting a specific data block of the certificate to have a fixed length (S240).

The server 110 may create an electronic signature by encrypting the digest using the server private key 200 (S250).

The server 110 may transmit the electronic signature encrypted, the certificate including the object public key 500, and the object private key 400 to the object 120 through a transport layer security (TLS) protocol (S260).

The object 120 may store the object private key 400 (S270).

The object 120 may transmit the object public key 500, the electronic signature, and the certificate to the autonomous driving platform 130 (S280).

The autonomous driving platform 130 may create a digest indicating a hash value in a Hash algorithm for converting a specific data block of the certificate to have a fixed length, when receiving the certificate including the object public key 500, and the electronic signature from the object 120 (S290).

The autonomous driving platform 130 may determine the digest by encrypting the electronic signature using the server public key 300 (S300).

The autonomous driving platform 130 may compare the digest of the certificate with a digest identified as the electronic signature is encrypted using the server public key 300 (S310).

The autonomous driving platform 130 may determine that the certificate as being verified, when the digests are matched with each other according to the comparison result.

As illustrated in FIG. 14, the object 120 may transmit an authentication request for the object to the autonomous driving platform 130 (S410).

The autonomous driving platform 130 may generate a random message for authenticating the object 120, when receiving the authentication request from the object 120 (S420).

The autonomous driving platform 130 may transmit the random message to the object 120 (S430).

The object 120 may receive e a random message for authenticating the object 120 from the autonomous driving platform 130.

The object 120 may encrypt the random message received by using the object private key 400, and may transmit the encrypted random message to the autonomous driving platform 130 (S450).

The autonomous driving platform 130 may decrypt the encrypted random message using the object public key 500 (S460), when receiving the random message encrypted, from the object 120.

The autonomous driving platform 130 may compare the random message created to authenticate the object 120 in S420 with the random message identified through the encryption (S470). The autonomous driving platform 130 may determine the object 120 as being authenticated, when the random message generated to authenticate the object 120 is matched with the random message identified through the decryption, according to a comparison result in S470.

The autonomous driving platform 130 may transmit the comparison result message to the object 120 (S480). For example, when the autonomous driving platform 130 may transmit the authentication completion message, when the two random messages are determined as being matched with each other in S480.

The autonomous driving platform 130 may admit the connection with the object 120, when determining the object 120 as being authenticated.

The object 120 may transmit the destination and the autonomous driving path to the autonomous driving platform 130, when authenticated by the autonomous driving platform 130 and connected to the autonomous driving platform 130.

The autonomous driving platform 130 may receive the autonomous driving path from the object 120, and may control the autonomous driving along the autonomous driving path.

Figure 15:
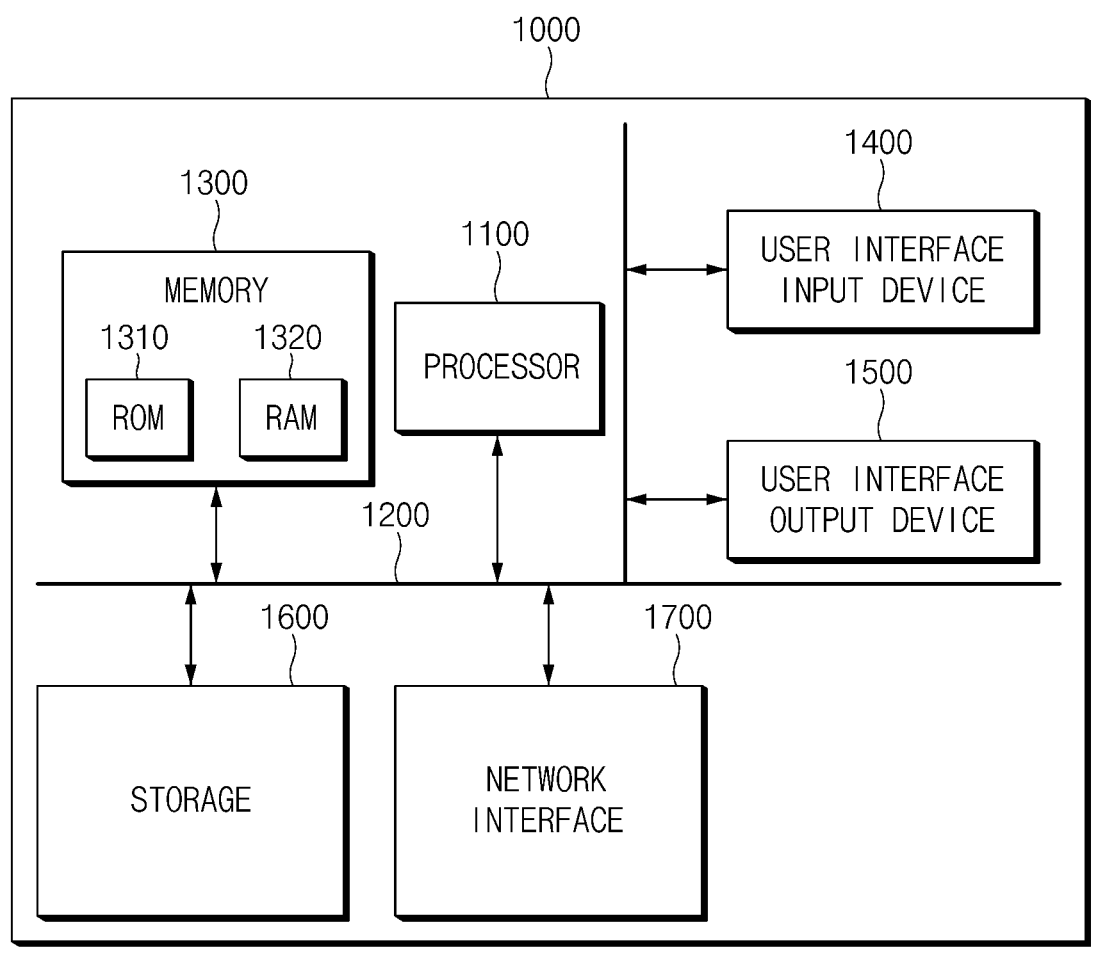
FIG. 15 is a block diagram illustrating a computing system to execute the method, according to an embodiment of the present disclosure.

FIG. 15 is a block diagram illustrating a computing system to execute the method, according to an embodiment of the present disclosure.

Referring to FIG. 15, a computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

The above description is merely an example of the technical idea of the present disclosure, and various modifications and modifications may be made by one skilled in the art without departing from the essential characteristic of the invention.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

According to an embodiment of the present disclosure, in the system and the method for operating the object, the object, which is to provide the product desired by the user, and the autonomous driving platform, which is to move the object to the destination, may be selected based on local information, and joined such that the joining structure autonomously drives.

According to another embodiment of the present disclosure, in the system and the method for operating the object, the main information including the product desired by the user, the information on the desired amount, and the information on the movement path may be encrypted in the server, the encrypted main information may be transmitted to the object, and the object may identify the main information by performing decryption using the public key received from the server, such that the main information transmitted and received between the server and the object is not easily open to the outside.

According to another embodiment of the present disclosure, in the system and the method for operating the object, the autonomous driving platform may have the reliability for the object, as the object requests the server to create the certificate, and is authenticated using the certificate received from the server, when the autonomous driving platform receives the connection request from the object and transmits an authentication request to the object.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for an object, the system comprising:

at least one autonomous driving platform configured to autonomously drive along an autonomous driving path;

at least one object loaded at the at least one autonomous driving platform, and unloaded from the at least one autonomous driving platform, the at least one object having a corresponding product; and a server comprising a processor configured to:

transmit encrypted information to a selected object, wherein the selected object is selected from the at least one object to provide a corresponding product, based on information on purchase of a product, create a certificate to authenticate the selected object, wherein when the autonomous driving platform receives a connection request from the selected object the server transmits an authentication request to the selected object, and encrypt information corresponding to a specific area, wherein the information corresponding to the specific area includes the information on the purchase of the product in the specific area, an autonomous driving path to the specific area, and information on a map including the specific area, wherein the server encrypts the information corresponding to the specific area by using a server private key and transmits an encrypted result to the selected object.

2. The system of claim 1, wherein the server is further configured to:

create the server private key and a server public key, and transmit the server public key to the selected object and the autonomous driving platform.

3. The system of claim 2, wherein the selected object decrypts the encrypted information using the server public key, and generates an autonomous driving path to the specific area.

4. The system of claim 2, wherein the selected object requests the server to create the certificate in response to receiving the authentication request from the autonomous driving platform.

15
16

5. The system of claim 4, wherein the server is configured to:

create an object private key and an object public key in response to receiving a request to create the certificate from the selected object, and transmit a signature to the selected object, the signature being encrypted using the server private key and the certificate including the object public key.

6. The system of claim 5, wherein the selected object stores the object private key, and transmits the encrypted signature and the certificate including the object public key to the autonomous driving platform.

7. The system of claim 6, wherein the autonomous driving platform is further configured to:

store the object public key, and verify the certificate by using the server public key and the object public key.

8. The system of claim 7, wherein the autonomous driving platform is further configured to:

authenticate the selected object through a challenge and response authentication after the certificate is completely verified.

9. The system of claim 7, wherein the autonomous driving platform is further configured to:

create a random message after the certificate is completely verified, and transmit the random message to the selected object.

10. The system of claim 9, wherein the selected object encrypts the random message using the object private key, and transmits an encrypted random message to the autonomous driving platform.

11. The system of claim 10, wherein the autonomous driving platform is configured to:

decrypt the encrypted random message using the object private key, compare a decrypted random message with the random message, and determine the selected object as being verified, when the decrypted random message is matched with the random message as a comparison result.

12. The system of claim 11, wherein the autonomous driving platform is configured to:

admit connection with the selected object after the selected object is authenticated.

13. The system of claim 11, wherein the server is further configured to:

request a distribution center to load a product allocated to the selected object onto the object after the selected object is connected to the autonomous driving platform.

14. The system of claim 13, wherein the selected object creates a movement path after the product is loaded onto the selected object, and transmits the movement path to the autonomous driving platform.

15. A method for operating an object, the method comprising:

transmitting encrypted information to a selected object, wherein the selected object is selected from among at least one object, wherein the at least one object is loaded at an autonomous driving platform configured to autonomously drive, unloaded from the autonomous driving platform, wherein the selected object further comprises and has a product, providing the product based on information for purchase of the product;

creating, by a server, a certificate to authenticate the selected object after the autonomous driving platform receives a connection request from the selected object and transmits an authentication request to the object;

encrypting, by the server, information corresponding to a specific area, wherein the information corresponding to the specific area includes the information on the purchase of the product in the specific area, an autonomous driving path to the specific area, and information on a map including the specific area, wherein the server encrypts the information corresponding to the specific area by using a server private key; and transmitting an encrypted result to the selected object.

16. The method of claim 15, further comprising:

creating, by the server, the server private key and a server public key; and transmitting the server public key to the selected object and the autonomous driving platform.

17. The method of claim 16, further comprising:

decrypting, by the selected object, the encrypted information corresponding to the specific area using the server public key, and generating an autonomous driving path to the specific area.

18. The method of claim 16, further comprising:

creating, by the server, an object private key and an object public key after receiving a request to create the certificate from the selected object to transmit a signature encrypted using the server private key and the certificate including the object public key to the selected object; and receiving, by the autonomous driving platform, the object public key from the selected object, storing the object public key, and verifying the certificate by encrypting the encrypted signature by using the server public key.

* * * * *